Oct. 27, 1953  A. D. STAUFFER  2,656,663
TRACTOR MOUNTED SWEEP RAKE
Filed Aug. 10, 1948  4 Sheets-Sheet 2

Inventor
Andrew Dillon Stauffer
By
William E. Nobbe
Attorney

Oct. 27, 1953 — A. D. STAUFFER — 2,656,663
TRACTOR MOUNTED SWEEP RAKE
Filed Aug. 10, 1948 — 4 Sheets-Sheet 3
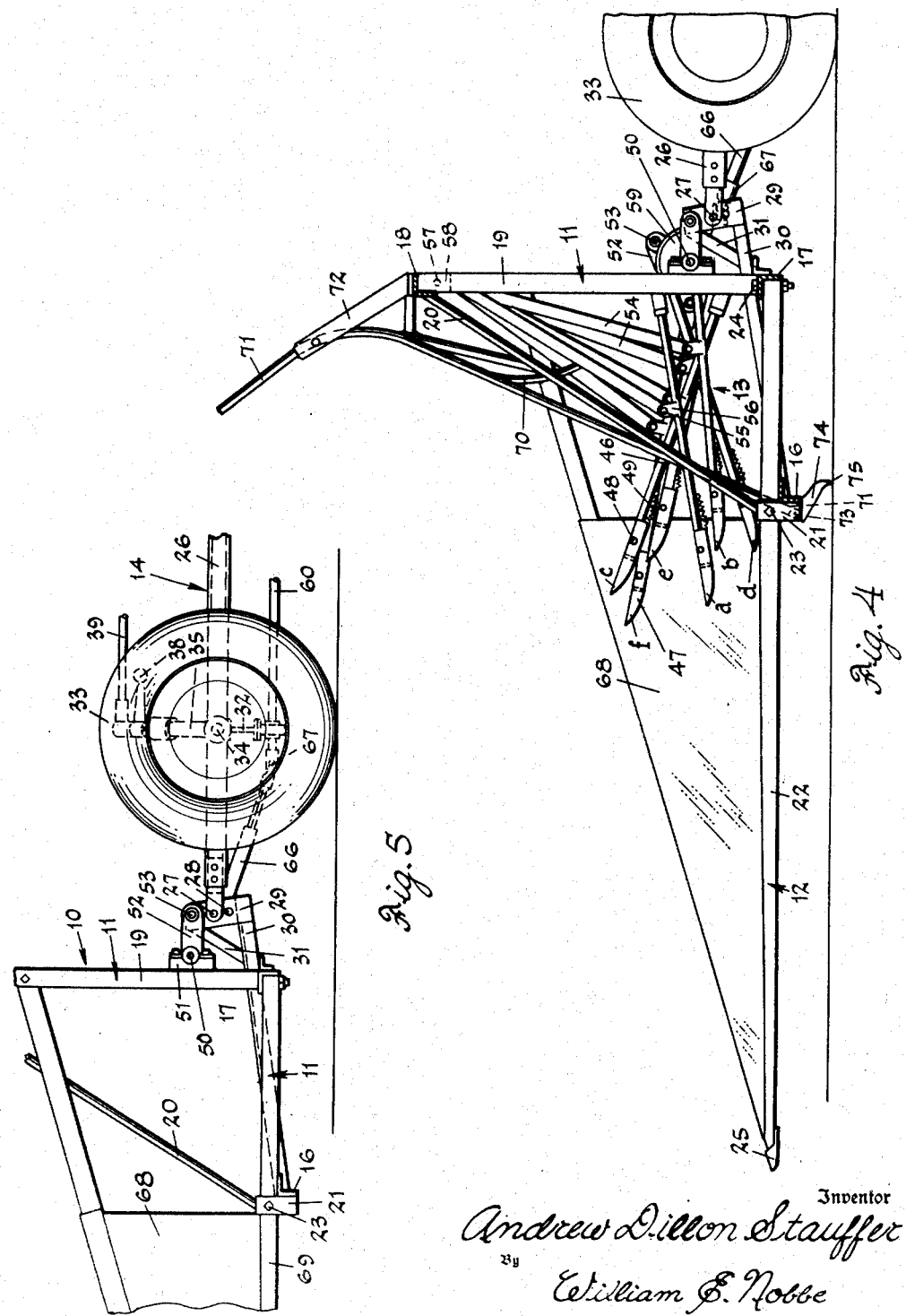
Inventor
Andrew Dillon Stauffer
By William E. Nobbe
Attorney Oct. 27, 1953 A. D. STAUFFER 2,656,663
TRACTOR MOUNTED SWEEP RAKE
Filed Aug. 10, 1948 4 Sheets-Sheet 4

Inventor
Andrew Dillon Stauffer
By
William E. Nobbe
Attorney

Patented Oct. 27, 1953

2,656,663

UNITED STATES PATENT OFFICE 2,656,663

TRACTOR MOUNTED SWEEP RAKE

Andrew Dillon Stauffer, Leipsic, Ohio

Application August 10, 1948, Serial No. 43,500

14 Claims. (Cl. 56—27)

The present invention relates broadly to agricultural implements and more particularly to a sweep rake designed for the gathering and transporting of hay, straw, and the like.

It is the primary purpose and object of this invention to provide a sweep rake of novel and improved construction which will hold and transport a relatively larger load of hay, straw, and the like than prior rakes of comparable size.

Another important object of the invention is the provision of such a sweep rake having means for retaining the normally larger load of material collected in place thereon and for enabling transportation thereof without danger of losing it.

Another important object of the invention is the provision of a sweep rake characterized by the provision of means or mechanism for engaging the loose material collected on the rake and for moving it to the rear of said rake and compacting the same into a relatively dense mass whereby the normal load of the rake is substantially increased.

Another object of the invention is the provision of material compacting mechanism automatically operable as the rake is propelled forwardly to continuously move the hay or straw rearwardly on the rake and form it into a relatively compact mass.

Another object of the invention is the provision of means associated with the rake for facilitating the unloading of the compacted mass of hay or straw therefrom.

A further object of the invention is the provision of such a rake having novel means for connection to a conventional farm tractor, the rake being mounted in advance of the tractor so that its position, movements and gathered load may be readily observed and easily and conveniently controlled by the operator of the tractor.

A still further object of the invention is the provision of such a rake which, while of relatively simple design for an implement of the above character, is of strong, sturdy and durable construction as well as efficient and reliable in operation.

Other objects and advantages of the invention will become more apparent during the course of the following description, when taken in connection with the accompanying drawings.

In the drawings, wherein like numerals are employed to designate like parts throughout the same:

Fig. 4 is a sectional view taken substantially on line 4—4 of Fig. 2;

Fig. 5 is a side view of a portion of the rake and supporting means therefor;

Fig. 11 is a diagrammatic view illustrating the compound movements described by the material gathering arms.

Figure 1:
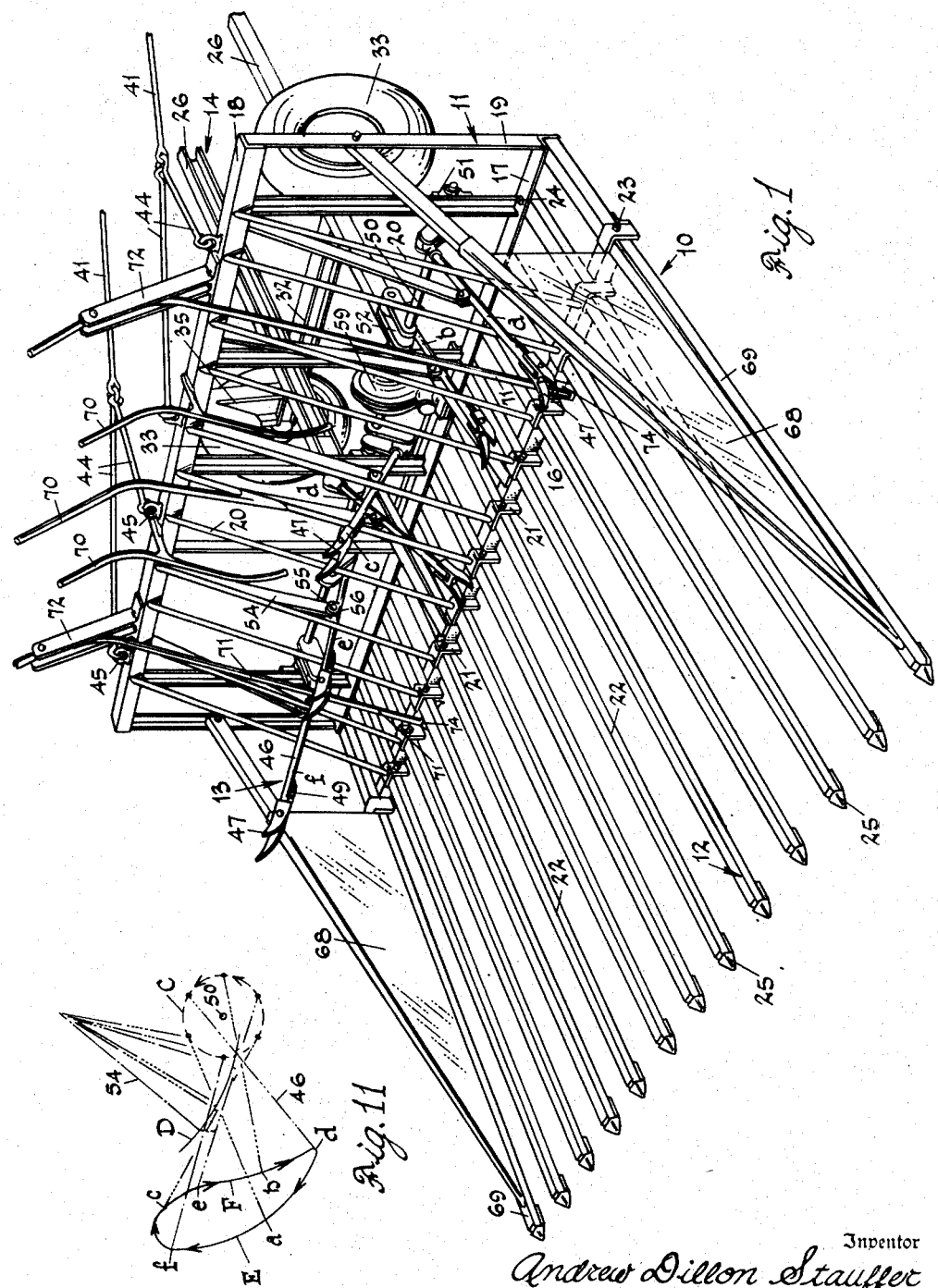
Fig. 1 is a perspective view of a sweep rake constructed in accordance with the present invention.
Figure 8:
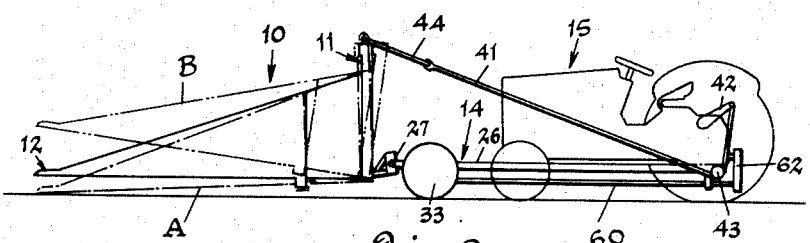
Fig. 8 is a diagrammatic view on a reduced scale showing the rake operatively associated with a conventional farm tractor.

With reference now to the drawings, and particularly to Fig. 1, there is disclosed a sweep rake constructed in accordance with the invention and generally indicated by the numeral 10, said rake comprising a structural frame 11 carrying a plurality of material gathering tines or prongs 12 and the material collecting and compacting mechanism 13. The frame 11 and associated parts are carried by a supporting means 14 shown as being operatively connected to a conventional farm tractor 15 (Fig. 8).

The frame 11 is fabricated, as by welding together the transversely disposed, horizontal angle bars 16, 17 and 18 and generally vertical braces 19 and 20. The horizontally spaced angle bars 16 and 17 constitute the bottom of the frame 11, while the horizontal angle bar 18, spaced above angle bar 17, constitutes the upper rail thereof and is supported at its opposite ends and also intermediate its ends by vertical braces 19 secured to said bar 18 and to the bar 17. The braces or struts 20 extend downwardly at an angle from bar 18 to bar 16 and are secured thereto. The bars 16 and 17 are so positioned relative to one another that the prongs 12 of the rake will be supported on the horizontal web of bar 16, with the inner end of each prong engaging the under-surface of the similarly disposed web of bar 17 and anchored thereby.

Figure 3:
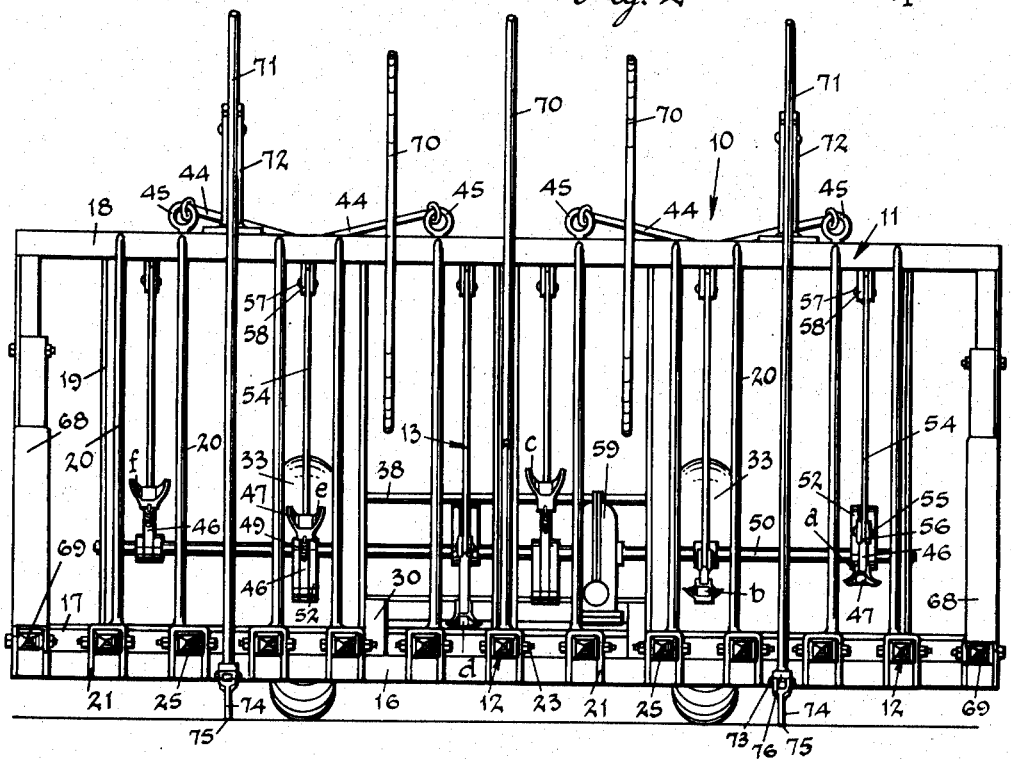
Fig. 3 is a front view thereof.

The material gathering prongs 12 are maintained in spaced, parallel relationship by inverted U-shaped straps 21 which are secured to and form a part of bar 16. Thus, as best shown in Fig. 3, the straps 21 and bar 16 cooperate to form rectangular openings through which the prongs are inserted. A slight deflection is produced in the length of the prongs between the straps 21 and bar 17 which serves to more effectively anchor the prongs since the major portions 22 thereof, extending forwardly from the bar 16, substantially hang from the point of support on the said bar. In order that the arrangement established between the frame 11 and prongs 12 may be maintained, suitable nut and bolt connections or the like 23 are used to secure the prongs in the straps 21, while similar connections 24 secure the rear ends of the prongs to the bar 17. This assures a very rigid implement while also affording a convenient means for disassembling the prongs from said frame for shipping, transportation, or storage purposes.

Since the prongs 12 usually employed in this type of rake are of wood, the outer ends thereof are preferably protected by pointed metal tips 25 so that when the rake is located in gathering position and the prongs are directed toward the ground, the leading ends thereof will be protected from splintering or otherwise becoming damaged.

Figure 9:
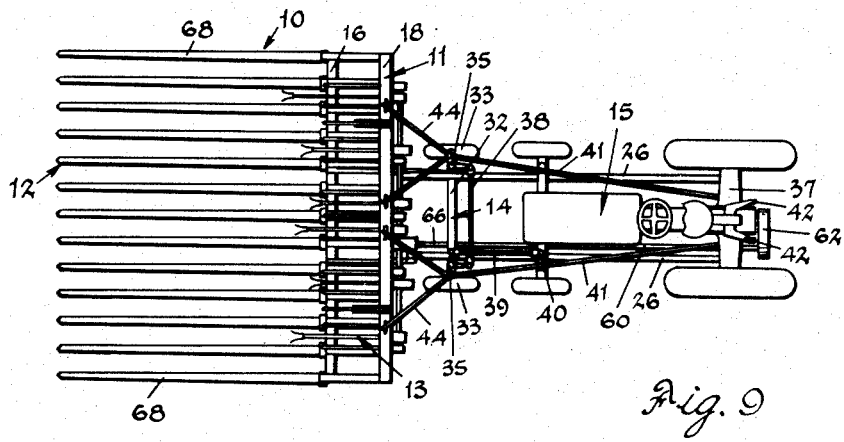
Fig. 9 is a plan view on a reduced scale of the rake and tractor.

The rake 10 is particularly adapted for use in conjunction with a motor powered tractor 15 such as is in common use for agricultural purposes. The general association of rake and tractor is illustrated in Figs. 5, 8 and 9, wherein the rake 10 is connected to the tractor 15 by the supporting means 14. The rake supporting means 14 comprises a pair of spaced horizontal rails 26 pivotally connected at their forward ends to the rake by pins 27 passing through openings 28 in fixed mounting plates 29 secured to bars 30 forming a part of frame 11 and held rigid by braces 31. Adjacent the forward ends thereof, the rails 26 are tied together by a transverse I-beam 32 supported at its opposite ends by ground wheels 33 mounted on stub axles 34 carried by king pins 35 in a well known manner.

The rails 26 parallel the body or carriage of the tractor and the rear ends thereof are suitably connected by bolts or the like 36 to the housing 37 of the rear axle of the tractor. Traction for the rake 10 is thus effected through the rails 26 and ground wheels 33 so that the rake is propelled ahead of the tractor to gather and transport loads of hay and the like. The ground wheels 33 are connected together at their king pin mountings 35 by a tie rod 38 which is in turn connected through a tie rod 39 to one steering knuckle of the front wheels of the tractor as at 40. With this arrangement, both forward and rearward motion, as well as turning of the tractor, are imparted to the mobile elements of the rake to the end that the rake and tractor can be easily maneuvered as a unit.

When the rake is in gathering position, it will assume the lowered position indicated by broken lines A in Fig. 8, while in transporting position it will assume the raised position indicated by broken lines B. The raising and lowering of the forward end of the rake is produced by bodily movement thereof about the pins 27. Movement of the rake to its different positions is effected by cables 41 attached at their rear ends to power actuated levers 42 forming a part of the tractor's power plant. From these levers, the cables are trained downwardly about pulleys 43 and thence forwardly, and attached, at opposite sides of the carriage, to forked links 44 pivotally connected to rings 45 secured to the upper rail 18 of frame 11. When the tractor control for the levers 42 is actuated, the rake will be swung to either of the positions indicated in Fig. 8, according to the direction of rotation of said levers. The close working relation between the raking implement 10 and tractor 15, as thus described makes it possible for complete operation of the rake to be handled with ease and efficiency from the customary driving position on the tractor.

Figures 6, 7:
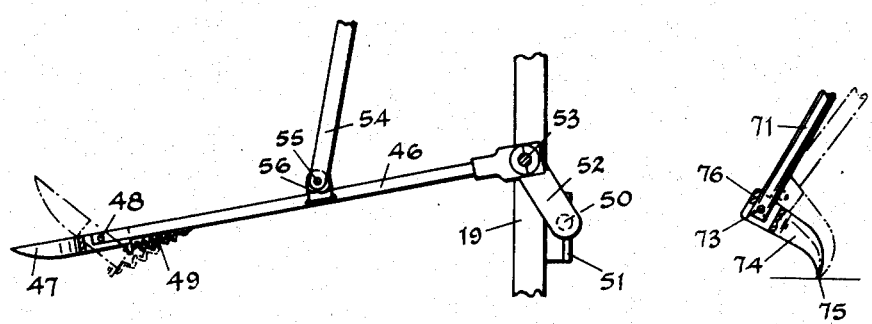
Fig. 6 is a detail view of one of the material gathering arms.
Fig. 7 is a detail view of the lower portion of one of the material unloading rods.

As the rake 10 is propelled forwardly and the gathered material accumulated on the prongs 12, the material is moved rearwardly of the rake and compacted into a more dense mass or pile by the collecting and compacting mechanism 13 to increase the over-all load. The collecting mechanism 13 comprises a plurality of and, as here shown, preferably six, oscillating arms 46 mechanically actuated so as to move forwardly and enter the gathered hay, then lift it upwardly and rearwardly, and retract therefrom as they are lowered. The outer end of each arm 46 carries a fork attachment 47 which facilitates engagement with the loose material. The fork 47 is pivotally carried at the end of arm 46 by a pin 48 and is held in normal extended or gathering position, as shown in full lines in Fig. 6, by a spring 49. When the arm 46 reaches the end of its forward and upward stroke and moves downwardly, the fork 47 is deflected upwardly by the resisting pressure of the accumulated material during downward sweep of the arm, as indicated in broken lines, thereby allowing the fork to be easily withdrawn from the compacted mass of hay.

The various positions assumed by the arms 46 and forks 47 in the cycle of their movement are best seen in Fig. 4, beginning with the lowermost arm $d$ and progressing upwardly and outwardly to the top of its movement as indicated by arm $f$, where each arm begins its downward course in a substantially rearward direction. The arms are automatically actuated so as to enter and withdraw from the hay at regularly separated intervals across the width of the rake by means of a common drive shaft 50 journalled in bearings 51 carried by vertical braces 19 and having crank portions 52. The arms 46 are mounted at their inner ends upon the crank pins 53 of cranks 52 and are thus moved forwardly and rearwardly as the cranks 52 are rotated.

Cooperating with crank shaft 50 to move the arms 46 through their oscillating movement are links 54 pivotally connected to the arms 46 intermediate their ends by pins 55 located in ears 56 attached to said arms. The opposite end of each link is hung by means of a pin 57 from a hanger plate 58 secured to the bar 18. Each link 54 causes its related arm 46 to follow an oscillating path upon rotation of the crank shaft 50. Thus, as each crank 52 revolves counter-clockwise through the upper half of its cycle, the related arm 46 is thrust forwardly and, by reason of its associated link 54, upward; likewise, as the said crank revolves through the bottom half of its cycle, the arm will be drawn rearwardly and simultaneously downwardly.

Figure 2:
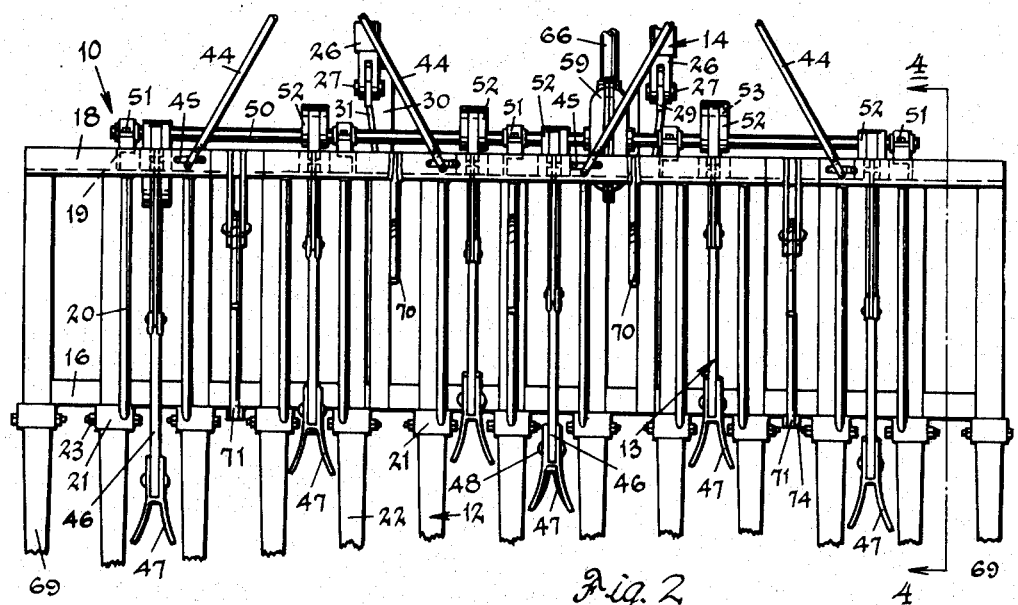
Fig. 2 is a plan view of a portion of the rake.

As the forked ends 47 of the material collecting arms 46 move rearwardly and downwardly, the rods or struts 20 cooperate to free the forks 47 from the hay. As shown in Figs. 2 and 3, these struts are located so as to create defining walls through which the arms and forks move. The struts, while serving to reinforce the framework 11, also afford effective means for stripping the gathered hay from the forks and urging it in an upward direction.

The crank portions 52 of crank shaft 50 are divided into two groups of three each, with the cranks of each group being arranged at an angle of 120 degrees with respect to one another, while the cranks of one group are also offset from those of the other group an additional angle of 60 degrees. Thus, there will be no sequential order of lifting of the arms 46 transversely of the rake, but rather the outward gathering movement of an arm located in one group will be followed by a similar movement of an arm located in the other group.

More particularly, upon reference to Figs. 1 and 4, the right-hand, outermost gathering arm *a* is passing through the central area of its upward path; the next arm *b* is approaching the lower limits of its movement; and the third arm *c* is moving to enter the downward and rearward cycle of its path. The relative positions of the arms, as denoted by their forked ends 47, indicate the spaced relation of one group arranged as described above. Proceeding to the fourth arm *d*, it will be seen that, in timing, it follows the first arm *a* and is advanced one-sixth of the cycle of revolution of the crank shaft 50; similarly, the fifth arm *e*, descending in a rearward direction, follows the second arm *b*, while the last or outermost arm *f* is approaching the crest of the upward motion and follows arm *c*. Such an arrangement of periodic entry of the forks 47 into the material being gathered on the rake has been found preferable since there will be no "feeding" of the hay toward either side of the raking implement and the general trend of material movement will be rearward and upward in a compacted mass more uniformly distributed across the rake.

The cycle of movement of the arms 46 is illustrated diagrammatically in Fig. 11. The crank portions 52 of crank shaft 50 describe a circle, as indicated by the letter C, and cooperate with the links 54 which swing in an arc, indicated by the letter D to cause each of the arms 46 to describe an irregular, closed path which resembles an inverted tear drop. The teetering of the arms 46 thus produces an upward, outward motion as indicated by the letter E to collect the hay and a subsequent downward, inward motion, indicated by the letter F, to retract the forked ends 47 of the arms from the hay.

Figure 10:
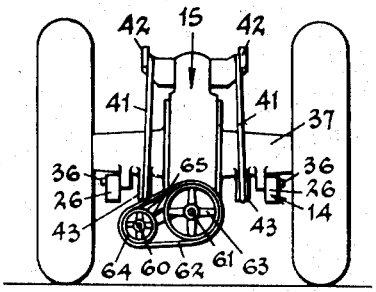
Fig. 10 is a rear view of the tractor showing its connections with and drive for the rake.

The crank shaft 50 is operatively connected to the power plant of the tractor through a transmission unit 59, carried by the frame 11 of the rake, and an articulated drive shaft 60. The shaft 60 is driven from the power take-off shaft 61 of the tractor, which is extended from the rear axle drive mechanism in the conventional manner. A belt 62 (Fig. 10) is trained about pulleys 63 and 64 keyed to shafts 60 and 61 to transmit the power. The shaft 60 is journalled in bearings 65 attached to the carriage of the tractor and drives the transmission unit 59 through a telescopic shaft section 66. Preferably, the shaft section 66 is interconnected with shaft 60 and transmission unit 59 through universal joints 67 in order that the operation of crank shaft 50 can be continuous despite the movement of the tractor relative to the rake, or vice versa, as they are propelled over uneven ground or as the rake is pivoted upon the pins 26 into any desirable material gathering position.

The gathered material is confined upon the rake by shields 68 secured to the outermost gathering prongs 69. These shields are substantially triangular and gradually rise from the gathering tip of the prong to the storage area of the rake at the back thereof. Cooperating, generally vertically disposed rods 70 and 71 are carried by the bar 18 to prevent escape of the hay rearwardly from the rake. As shown in the various figures, the rods 70 are fixedly attached to the bar 18 while the rods 71 are pivotally carried in brackets 72.

The rods 71 extend downwardly, with their lower ends being located forwardly of and engaging bar 16. Pivoted to the lower end of each rod 71, as at 73, is a swinging hook 74. During forward or gathering movement of the rake, the rods 71 are prevented from moving rearwardly by the bar 16, while hooks 74 are adapted to ride freely over the ground due to the pivotal connection 73. However, when the tractor 15 is reversed to draw the rake 10 rearwardly, the pointed toe 75 of each hook 74 bites into the ground and is prevented from swinging forwardly relative to the rod by a cross-web 76. This results in the rods 71 being held stationary while the rake moves rearwardly. Due to this relative movement between the rods 71 and rake, the rods act to free the accumulated material from its compacted, loaded position, and force it to move forwardly and off of the prongs 12.

When moving the raking implement 10 into a field of cut material, the prongs 12 may be located in a substantially horizontal plane or tilted in a slightly upward direction. Having entered the field, the rake is swung upon the pins 27 when the control for the levers 42 is engaged to release the cables 41 and allow them to drop or lower the prongs 12 toward the ground. During forward movement of the tractor and rake, the cut hay will be carried onto the prongs and rearwardly into an accumulated mass. The loosely bunched mass is picked up by the gathering arms 46 and is compacted into a denser formation as the arms are operated to force the gathered hay rearwardly and upwardly. The arms are caused to function when the power take-off shaft 61 is operatively connected to the motor of the tractor and said power is transmitted through the shaft 60 to the transmission unit 59 and crank shaft 50.

When it becomes necessary to turn the rake 10 and tractor so as to enter a field, or maneuver the rake therein, turning of the tractor is transmitted through the rods 38 and 39 and from the steering knuckles 40 to the wheels 33 on which the rake is carried.

Having obtained a full load of material on the raking implement, the power take-off is disengaged to discontinue operation of the gathering arms 46 and the control for the levers 42 is actuated so that the cables 41 will swing the rake bodily from the gathering position A in Fig. 8 to carrying position B. Unloading of the rake is subsequently accomplished by returning the rake to gathering position and moving the tractor rearwardly of the piling area. As the rake is caused to move with the tractor, the points 75 of hooks 74, carried by the rods 71, enter the ground and cause the rods to swing forwardly about their pivots in the brackets 72. The rods 71 thus act to discharge the hay or to automatically initiate the movement thereof outwardly along the prongs 12 until, by reason of the compacted condition of the hay, it moves bodily away from the raking implement. Subsequently, during gathering of the hay, the hooks 74 will swing freely at the ends of the rods 71 and engage the ground only by reason of their weight and manner of mounting.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A sweep rake having a frame and forwardly directed material gathering prongs carried by said frame, characterized by the provision of a plurality of oscillating arms carried by the frame and cooperating with the inner end portions of the prongs for engaging the material gathered by the prongs and for lifting and moving it rearwardly and upwardly to form a compact mass upon the inner end portions of said prongs, and means for limiting rearward movement of the mass of material upon the said prongs.

2. A sweep rake having a frame and forwardly directed material gathering prongs carried by said frame, characterized by the provision of a plurality of oscillating arms carried by the frame and cooperating with the inner end portions of the prongs for engaging the material gathered by the prongs and for lifting and moving it rearwardly and upwardly to form a compact mass upon the inner end portions of said prongs, means also carried by said frame for oscillating said arms, and means forming a part of the frame acting to strip the material from said arms during oscillation of the said arms.

3. A sweep rake having a frame and forwardly directed material gathering prongs carried by said frame, characterized by the provision of a horizontal crank shaft rotatably mounted upon said frame and having a plurality of crank portions, arms carried by said crank portions, links pivotally connected at one end to said frame and at their opposite ends to said arms substantially intermediate their ends, and means for driving said crank shaft to oscillate said arms through closed paths to engage the material gathered by said prongs and for lifting and moving it rearwardly thereupon.

4. A sweep rake having a frame and forwardly directed material gathering prongs carried by said frame, characterized by the provision of a horizontal crank shaft rotatably mounted upon said frame and having a plurality of crank portions equally spaced around the shaft, arms carried by said crank portions, links pivotally connected at one end to said frame and at their opposite ends to said arms substantially intermediate their ends, and means for driving said crank shaft to oscillate said arms through closed paths to successively engage the material gathered by said prongs and for lifting and moving it rearwardly thereupon.

5. A sweep rake having a frame and forwardly directed material gathering prongs carried by said frame, characterized by the provision of a horizontal crank shaft rotatably mounted upon said frame and having a plurality of crank portions, arms carried by said crank portions, links pivotally connected at one end to said frame and at their opposite ends to said arms substantially intermediate their ends, and means for driving said crank shaft to oscillate said arms through closed paths to successively engage the material gathered by said prongs and for lifting and moving it rearwardly thereupon, said crank portions being separated into two groups, those of each group being equally spaced around the shaft, with the crank portions of one group axially offset with respect to those of the other group.

6. A sweep rake having a frame and material gathering prongs, characterized by the provision of a plurality of oscillating arms mounted upon the frame, forks pivotally carried at the outer ends of the arms, spring means normally maintaining the forks in substantial alignment with said arms, and means for oscillating the arms to cause the forks to move forwardly and upwardly to engage the material gathered by the prongs and move it rearwardly thereupon and then downwardly and rearwardly to disengage the forks from said material, the said forks being urged upwardly by the material and against the action of said spring means as the said arms move downwardly and rearwardly.

7. A sweep rake having a frame and material gathering prongs, characterized by the provision of a horizontal crank shaft rotatably mounted upon said frame and having a plurality of crank portions, arms carried by said crank portions, links pivotally connected at one end to said frame and at their opposite ends to said arms, forks pivotally carried at the outer ends of the arms, spring means normally maintaining the forks in substantial alignment with said arms, and means for rotating said crank shaft to oscillate the arms and thereby cause the forks to move forwardly and upwardly to engage the material gathered by the prongs and move it rearwardly thereupon and then downwardly and rearwardly to disengage the forks from said material, the said forks being urged upwardly by the material and against the action of said spring means as the said arms move downwardly and rearwardly.

8. A sweep rake having a frame and material gathering prongs, characterized by the provision of a plurality of oscillating arms mounted upon the frame, forks pivotally carried at the outer ends of the arms, spring means normally maintaining the forks in substantial alignment with said arms, means for oscillating the arms to cause the forks to move forwardly and upwardly to engage the material gathered by the prongs and move it rearwardly thereupon and then downwardly and rearwardly to disengage the forks from said material, the said forks being urged upwardly by the material and against the action of said spring means as the said arms move downwardly and rearwardly, and struts forming a part of the frame extending forwardly and downwardly at opposite sides of said arms and acting to strip the material from the forks upon downward and rearward movement thereof and for urging said material in an upward direction.

9. A sweep rake having a frame and forwardly directed material gathering prongs carried by said frame, a horizontal crank shaft rotatably mounted upon said frame and having a plurality of crank portions, arms carried by said crank portions, links pivotally connected at one end to said frame and at their opposite ends to said arms, means for supporting said rake adapted for attachment to a tractor, and means having operative connections with said crank shaft and tractor for driving said shaft to oscillate said arms through closed paths to engage the material gathered by said prongs and for lifting and moving it rearwardly thereupon.

10. A sweep rake having a frame and forwardly directed material gathering prongs carried by said frame, a horizontal crank shaft rotatably mounted upon said frame and having a plurality of crank portions, arms carried by said crank portions, links pivotally connected at one end to said frame and at their opposite ends to said arms intermediate the ends thereof, means for supporting said rake adapted for attachment to a tractor, means having operative connections with said crank shaft and tractor to effect rotation of said shaft to oscillate said arms through closed paths to engage the material gathered by said prongs and for lifting and moving it rearwardly thereupon, means attached to the frame of the rake and adapted to be connected to the tractor for raising and lowering the rake, and means carried by said supporting means adapted for attachment to the tractor to impart turning movement of the tractor to the rake.

11. A sweep rake having a frame and material gathering prongs, characterized by the provision of a plurality of movable elements carried by the frame for engaging the material gathered by the prongs and for moving it rearwardly thereupon, means also carried by said frame for actuating said movable elements, and rods pivoted at their upper ends to the frame and extending forwardly and downwardly, said rods being inoperative when the rake is being moved forwardly to gather the material but adapted to dig into the ground and to effect unloading of the material when the rake is moved rearwardly.

12. A sweep rake having a frame and material gathering prongs, characterized by the provision of a plurality of oscillating arms carried by the frame for engaging the material gathered by the prongs and for moving it rearwardly thereupon, means also carried by said frame for oscillating said arms, rods pivoted at their upper ends to the frame and extending forwardly and downwardly, and hooks pivotally carried at the lower ends of said rods, said hooks being adapted to ride freely over the ground when the rake is propelled forwardly but adapted to dig into the ground to hold said rods stationary and effect unloading of the material, when the rake is moved rearwardly.

13. A sweep rake having a frame and forwardly directed material gathering prongs carried by said frame characterized by the provision of a horizontal crank shaft rotatably mounted upon said frame and having a plurality of crank portions, arms carried by said crank portions, links pivotally connected at one end to said frame and at their opposite ends to said arms substantially intermediate their ends, and means for rotating said crank shaft to oscillate the arms to cause the forward ends thereof to move forwardly and upwardly to engage the material gathered by the prongs and move it rearwardly thereupon and then downwardly and rearwardly to disengage the ends of said arms from said material.

14. A sweep rake having a frame and forwardly directed material gathering prongs carried by said frame, characterized by the provision of a plurality of oscillating arms mounted upon the frame, means for oscillating the arms to cause the outer ends thereof to move forwardly and upwardly to engage the material gathered by the prongs and move it rearwardly thereupon and then downwardly and rearwardly to disengage the ends of said arms from said material, and struts forming a part of the frame extending forwardly and downwardly at opposite sides of said arms and acting to strip the gathered material from the said arms upon downward and rearward movement thereof.

ANDREW DILLON STAUFFER.

References Cited in the file of this patent

UNITED STATES PATENTS

| Number | Name | Date |
|---|---|---|
| 1,262,674 | Jones | Apr. 16, 1918 |
| 1,384,919 | Reed | July 19, 1921 |
| 1,729,084 | Pearson | Sept. 24, 1929 |
| 1,773,446 | Rutter | Aug. 19, 1930 |
| 1,817,361 | Garretson | Aug. 4, 1931 |
| 2,168,266 | McElwain | Aug. 1, 1939 |
| 2,466,114 | Kramer | Apr. 5, 1949 |
| 2,525,090 | Bott | Oct. 10, 1950 |